United States Patent [19]
Pozsgay

[11] 3,994,191
[45] Nov. 30, 1976

[54] FLYING SHEAR WITH ANTIFRICTION CARRIAGE SUPPORT

[75] Inventor: Dezsoe Albert Pozsgay, Pittsburgh, Pa.

[73] Assignee: Aetna-Standard Engineering Company, Ellwood City, Pa.

[22] Filed: Oct. 30, 1975

[21] Appl. No.: 627,062

[52] U.S. Cl. .................................. 83/320; 83/559; 83/700
[51] Int. Cl.² ........................................ B23D 25/02
[58] Field of Search ............. 83/320, 319, 318, 328, 83/284, 559, 560, 571, 698, 700

[56] References Cited
UNITED STATES PATENTS

| | | | |
|---|---|---|---|
| 3,229,791 | 1/1966 | Soman ............................. | 83/698 X |
| 3,371,515 | 3/1968 | Munschauer, Jr. ................ | 83/698 X |
| 3,559,522 | 2/1971 | Valente ............................. | 83/571 |
| 3,881,382 | 5/1975 | Rasenberger et al. ............. | 83/320 X |

*Primary Examiner*—Frank T. Yost
*Attorney, Agent, or Firm*—Mandeville and Schweitzer

[57] ABSTRACT

A flying shear is disclosed in which a shear carriage is arranged to be driven along the pass line of a moving strip, between a pair of spaced shear platens. The carriage is constructed for telescoping movement and mounts a pair of cooperating carriage plates. The platen members are stationary, but are arranged to have relative closing and opening movement, in order to telescopically compress the shear carriage at desired times, to effect a shearing operation.

A novel form of support is provided for the shear carriage, enabling the carriage normally to be supported from the platen structure by means of antifriction rollers, which accommodate rapid acceleration and high speed movement of the carriage. At the instant when the shearing operation is to occur, however, the closing movement of the platens serves to effectively disable or retract the antifriction roller support for the carriage and cause the carriage to be supported by relatively broad area, elongated, sliding friction bearing surfaces. The arrangement is such that the advantages of the antifriction support are realized for rapid acceleration and high speed travel of the carriage, while at the same time the heavy shock loading of the shearing operation itself is effectively isolated from the antifriction elements.

11 Claims, 5 Drawing Figures

FLYING SHEAR WITH ANTIFRICTION CARRIAGE SUPPORT

RELATED PATENTS AND APPLICATIONS

This application is directed to flying shear equipment of the general type shown in the Dolle U.S. Pat. No. 3,869,949, and also in the copending Schuetz et al. U.S. application Ser. No. 600,265, filed July 31, 1975 for "Flying Cutter with Continuous Workpiece Support".

BACKGROUND AND SUMMARY OF THE INVENTION

In the general form of flying shear apparatus disclosed in the beforementioned U.S. Pat. No. 3,869,949, a shear carriage, mounting a pair of cooperating shear blades, is supported on a stationary platen. Continuously moving strip, drawn from a coil, passes through the open shear blades and is severed periodically into sheets of desired length. When it is desired to sever the strip, the shear carriage is accelerated in the direction of strip travel, until it is moving substantially synchronously therewith. At that moment, a second platen, positioned above the carriage, is actuated to close toward the lower platen, compressing the shear carriage and causing the shear blades to close and sever the work. The arrangement of the described shear is such that the shear carriage itself may be of relatively light construction, capable of being accelerated to speed in a relatively short distance. The basic shear loading, on the other hand, is developed by the heavy but stationary platens.

During the actual shearing operation, when the platens are closed onto the moving shear carriage, the heavy shearing forces are transmitted from the platens to the shear carriage by means of elongated pairs of bearing strips, which permits the carriage to continue its movement along the pass line, while the work is being sheared.

Particularly in connection with strip lines and the like where the strip is traveling at relatively high speeds, the matter of acceleration of the shear carriage to strip speed within a short distance represents a significant problem, considering the necessary mass of the shear carriage and the friction involved in sliding the carriage over the lower shear platen. Heretofore, efforts have been made to reduce the effort required to accelerate te shear carriage by utilizing antifriction roller bearings for the support of the carriage. However, such arrangements have not been satisfactory in a practical sense, because of the extremely heavy shock loading to which the carriage is subjected during the moments that the actual shearing is taking place. These severe shock loading conditions have resulted in premature failure of the antifriction bearings.

Pursuant to the invention, a novel and significantly improved arrangement is provided for a flying shear of the general type described, whereby the shear carriage is primarily supported in the planten structure by anitifriction roller bearing means, accommodating rapid acceleration and high speed travel of the carriage throughout most of its cycle of travel. Unlike the prior arrangements, however, the structure of the invention includes a novel arrangement of sliding friction bearings, in the form of pairs of elongated bearings strips arranged on the shear carriage and platens, which are inactive during the initial phases of carriage acceleration and movement, but are arranged to take the shear loading during the actual shearing operation. In this manner, the primary advantages of the roller bearing support are realized, while at the same time avoiding imposing shock loading on the bearings.

Pursuant to another and more specific feature of the invention, the shear carriage may be supported by anitifriction roller bearings means only by the upper platen, with the entire carriage being, in effect, suspended by the antifriction roller bearing means. When the shear platens are closed, as by lowering of the upper platen, the relatively broad area, sliding friction bearing elements are brought into cooperating engagement, and the roller bearings simply lift off the surfaces on which they normally run. The entire load is then taken up by the sliding friction bearings. Since, at this point in the cycle, the carriage is already moving at full speed, and the shearing operation is only momentary, the extra friction caused by the sliding bearing surfaces does not materially interfere with the desired movement of the carriage.

For a more complete understanding of the above and other features and advantages of the invention, reference should be made to the following detailed description and to the accompanying drawings.

DESCRIPTION OF A PREFERRED EMBODIMENT

Figure 1:
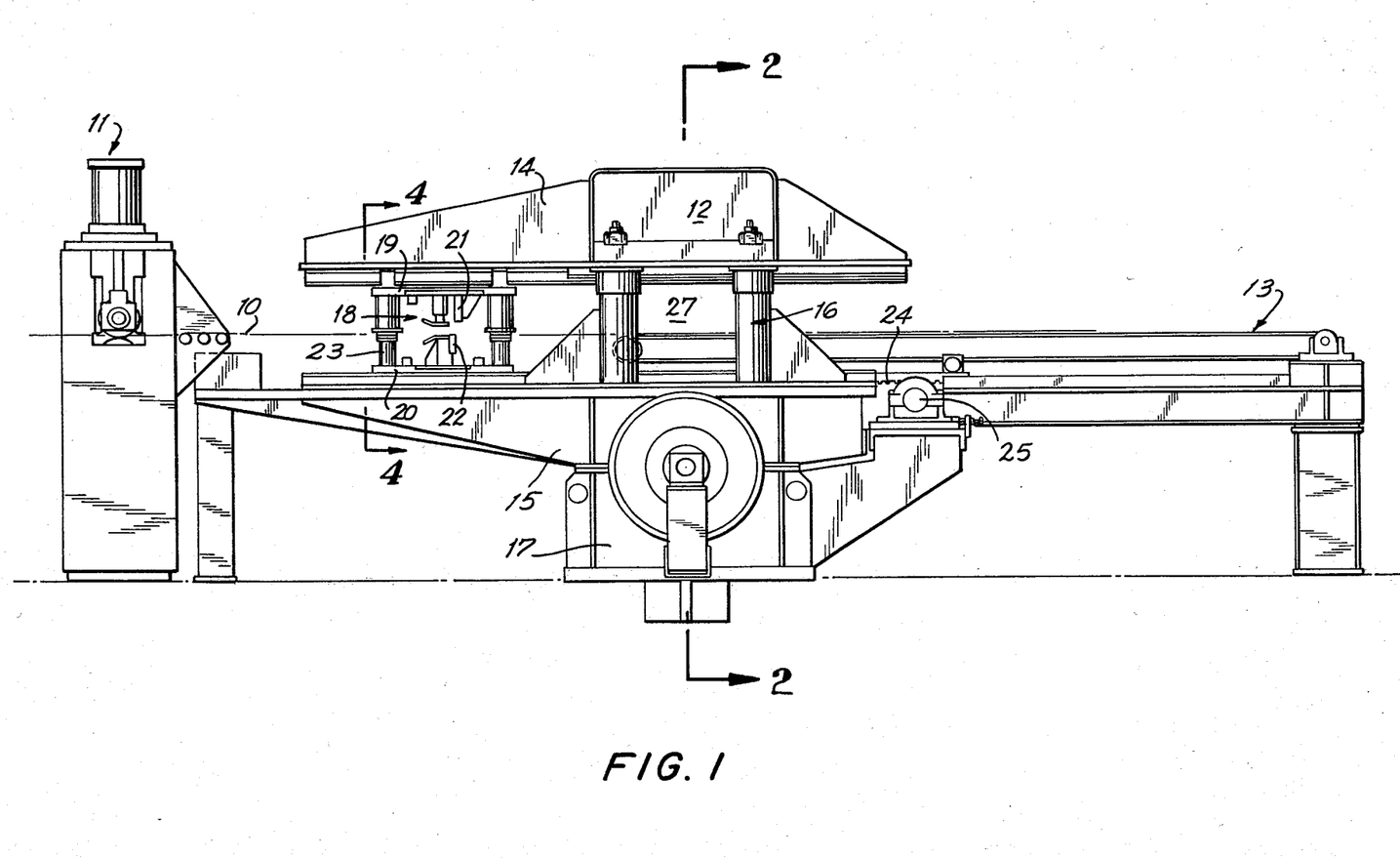
FIG. 1 is a side elevational view of a flying shear installation incorporating the features of the invention, as used in connection with a typical metal strip line, for example.

Referring now to the drawings, and initially to FIG. 1 thereof, the reference numeral 10 indicates the pass line plane of a strip processing line. When the line is operating, strip is moving from left to right. The strip is drawn from an uncoiler (not shown) through a pinch roll stand 11, and then through a normally inactive flying shear 12, to be described. Periodically, the shear is actuated, to cut the strip into sheets, which are then advanced by an exit conveyor section 13 to a sheet stacker or the like, from which it is discharged for further processing (not shown).

In its generalities, the flying shear installation 12 is constructed along the lines of the shear disclosed in prior U.S. Pat. No. 3,869,949. It includes upper and lower shear platens 14, 15, which are telescopically connected by heavy tie rod assemblies 16. The lower platen 15 is mounted in fixed relation on a base 17, while the upper platen 14 is mounted by the tie rod assemblies 16 for limited vertical movement.

Supported between the platens 14, 15 is a shear carriage, generally designated by the reference numeral 18. The shear carriage 18 is movable between the platens, in the direction of the pass line 10 and includes upper and lower carriage plates 19, 20 mounting shear blades 21, 22 respectively and connected telescopically for limited vertical movement toward each other by means of telescoping guide posts 23. The carriage 18 is arranged to be driven in the direction of the pass line, by means such as a rack 24 driven by a pinion 25 from a suitable drive motor (not shown).

Figure 3:
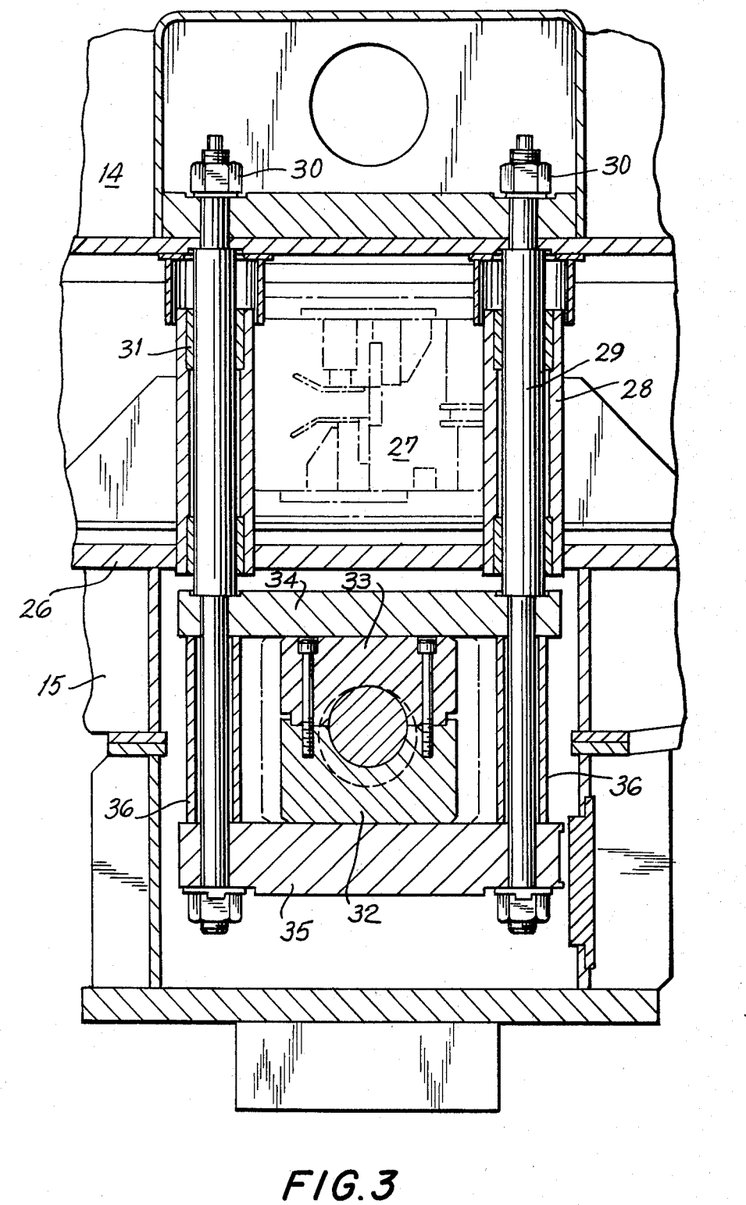
FIG. 3 is a cross sectional view as taken generally along lines 3—3 of FIG. 2.

As reflected in FIG. 3, the lower platen structure 15 includes a heavy, horizontally extending supporting plate 26, which extends both upstream and downstream from the area 27 of primary shear load. In the shear load area, the lower platen structure mounts a plurality (typically four) of tubular tie rod bearings 28, which extend upward toward the upper platen structure 14 and serve to slideably guide and support a plurality of tie rod members 29. At their upper ends, the tie rods 29 are rigidly anchored to the upper platen structure 14 by nuts 30. The tie rods extend downward from the upper platen structure, through bearing sleeves 31, projecting below the plate 26 of the lower platen. At their lower ends, the tie rods 29 are connected to a bearing assembly, comprising bearing blocks 32, 33 and slide bars 34, 35. The slide bars 34, 35 are anchored directly to the tie rods, being spaced apart by means of spacer tubes 36, with the bolted-together bearing blocks 32, 33 being slideably received in the "window" formed by the slide bars.

A main drive shaft 36 (FIG. 2) is supported for rotation in main bearings 37 mounted in the lower platen structure. At one end of the drive shaft there is provided a fly wheel 38 and clutch 39. The fly wheel is arranged to be driven by suitable means (not shown) at an appropriate speed, independently of the shaft 36. When a shearing operation is to occur, the clutch 39 is engaged, so that the shaft 36 is connected to the main drive as well as to the fly wheel 38. The clutch 39 is a single revolution clutch, serving to rotate the shaft 36 through a single revolution only, for each actuation of the clutch.

Figure 2:
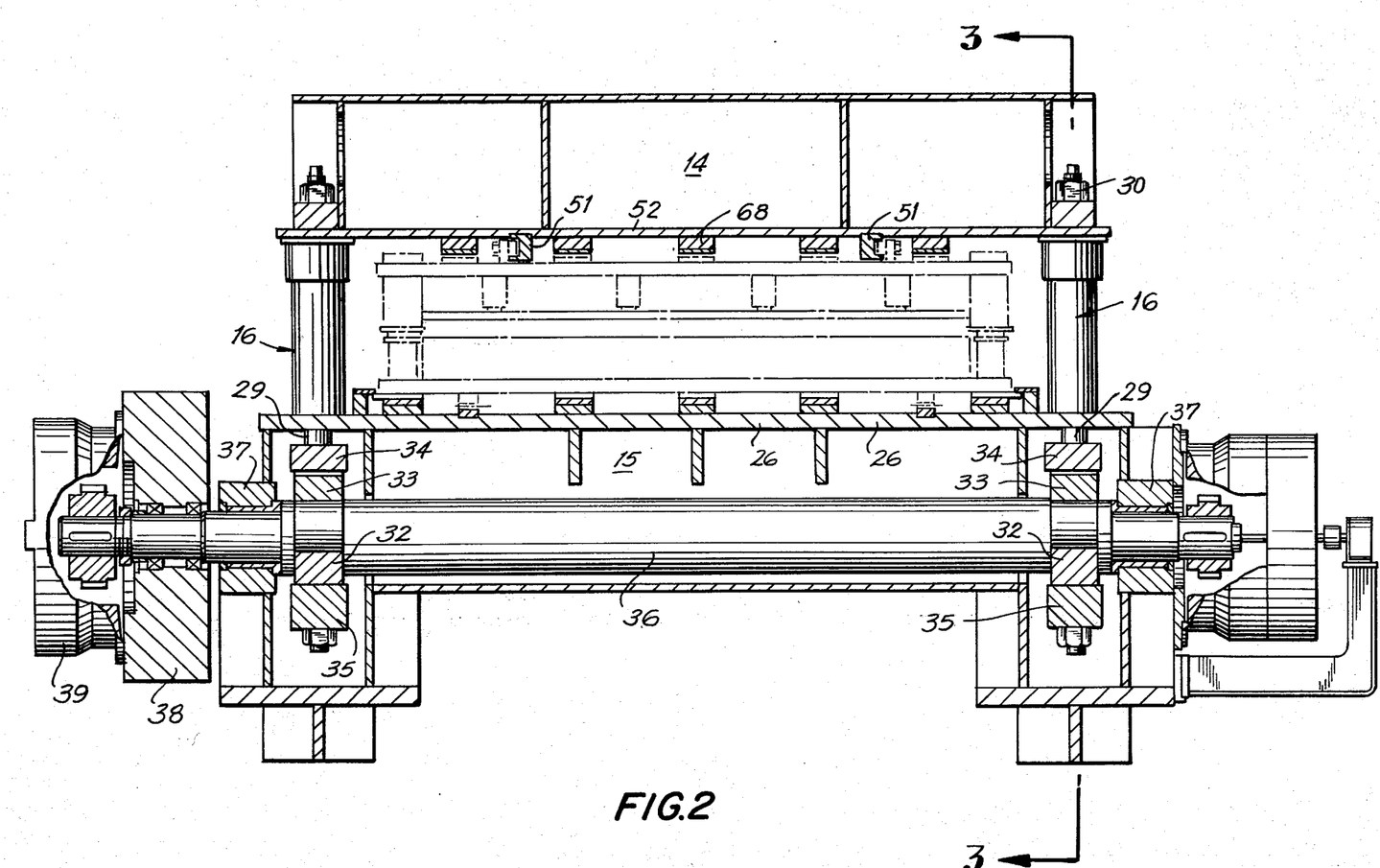
FIG. 2 is a cross sectional view as taken generally on line 2—2 of FIG. 1.

As reflected in FIG. 2, the main drive shaft 36 has eccentric portions 40 engaging the bearing blocks 32, 33. In the normal or ready position, the shaft 36 is oriented with the eccentric portions 40 at the uppermost point of their path of rotation. Thus, when the clutch 39 is engaged, the eccentrics move down, to draw the tie rods 29 and thus the upper platen 14 downward through a limited stroke, sufficient to effect a shearing operation.

Figure 5:
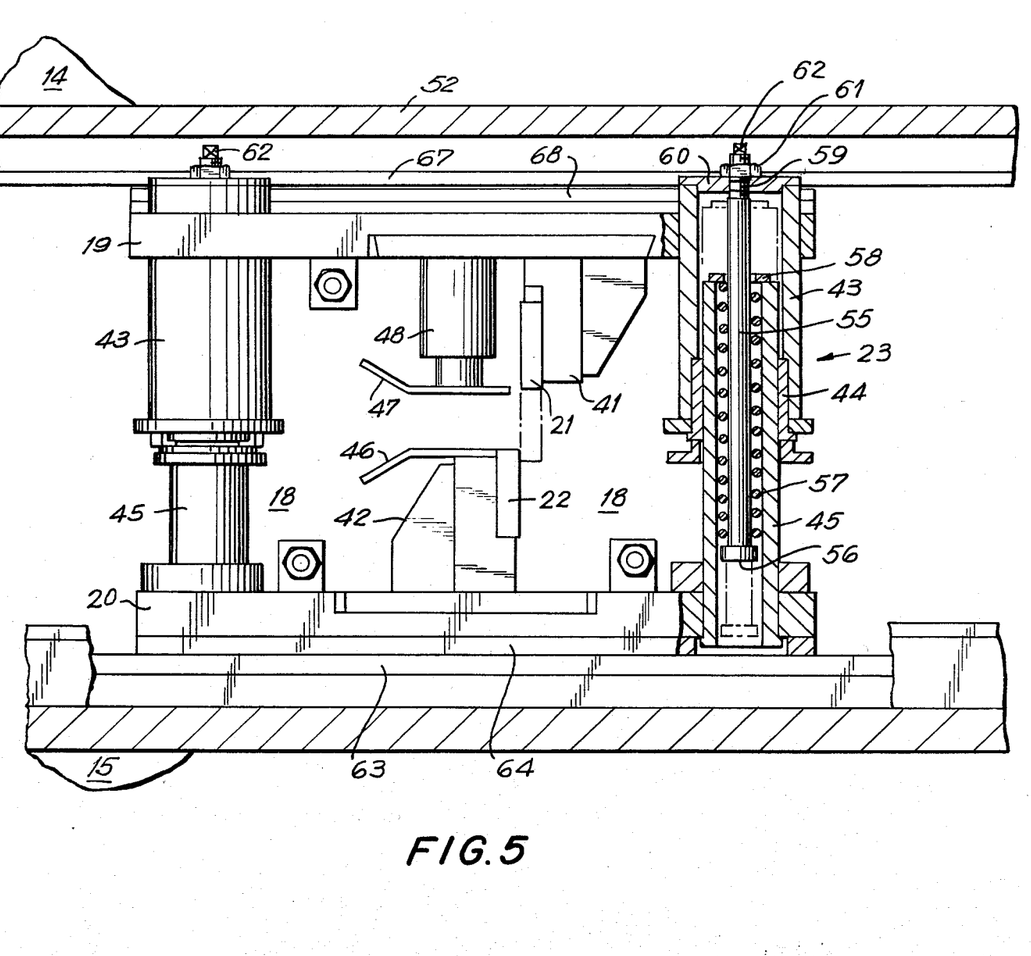
FIG. 5 is a cross sectional view as taken generally along line 5—5 of FIG. 4, with parts broken away to show additional details.

The shear carriage 18, shown in detail in FIG. 5, includes blade holders 41, 42 mounting shear blades 21, 22 respectively. The telescoping guides 23 connecting the upper and the lower carriage plates are comprised of upper guide tubes 43, mounting bearing sleeves 44, and arranged to receive lower guide tubes 45. The upper and lower guide tubes are rigidly secured to the respective upper and lower carriage plates 19, 20, such that the two plates are connected and accurately guided for limited vertical motion, sufficient to enable the shear blades 21, 22 to execute the necessary shearing motion.

The shear carriage 18 also includes clamping members 46, 47 for holding the strip during the shearing operation. The lower clamp member 46 is fixed to the blade holder 42, while the upper clamping member 47 is movably mounted by means of a plurality of telescopic supports 48.

When the upper platen structure is pulled downward to execute a shearing operation, the upper carriage plate 19 is forced downward, toward the lower plate, first to bring the clamping members 46, 47 into engagement with the strip and next to bring the shear blades 21, 22 into coacting, shearing relation.

In accordance with one of the significant features of the invention, the shear carriage 18 is normally supported in the platen structure primarily by antifriction roller bearing means, to permit rapid acceleration and high speed movement of the carriage in this direction of strip travel. To this end, the upper carriage plate 19 is provided near each side, with a plurality of suspension lugs 49 to which are mounted in cantilever fashion a like plurality of antifriction bearing wheels 50. In a practical embodiment of the invention, for use in connection with a 54 inch mill, a total of four such antifriction bearing wheels is adequate for the purposes indicated. The several bearing wheels are received in horizontally opening channel members 51, which are welded or otherwise secured to the plate member 52 of the upper platen structure and extend lengthwise of the platen far enough to accommodate the full operating stroke of the shear carriage. The elongated channel members 51 are provided with lower, horizonatlly extended flanges 53, on which the bearing wheels 50 are supported. In addition, a certain amount of clearance space is provided directly above the bearing wheels 50, as indicated at 54 in FIG. 4.

Since the entire shear carriage 18 is supported from the upper platen structure 14 by the bearing wheels 50, suspension means are provided to transfer the weight of the lower carriage plate 20 and its supported components to the upper carriage plate 19. Referring again to FIG. 5, the inner guide tube 45 of each of the telescoping post assemblies 23 receives a suspension rod 55 having an enlarged head 56 at its lower end. A compression spring 57 is received over the suspension rod 55, and is engaged by the enlarged head 56. The spring 57 is arranged to be received entirely within the lower guide tube 45, and the upper end of the guide tube is partly closed by a welded-on washer 58, which provides an abutment shoulder for the upper end of the spring 57. The upper end of the suspension rod 55 is threaded, as at 59. This threaded portion is arranged to project through an end plate 60 at the top of the upper guide tube 43. A nut 61 engages the threaded portion of the suspension rod, enabling it to be adjustably positioned, for purposes to be described. Desirably, the upper extremity 62 of the suspension rod is squared or otherwise arranged for engagement with a wrench or holding tool, so that the rod may be held stationary while the nut 61 is adjusted.

Figure 4:
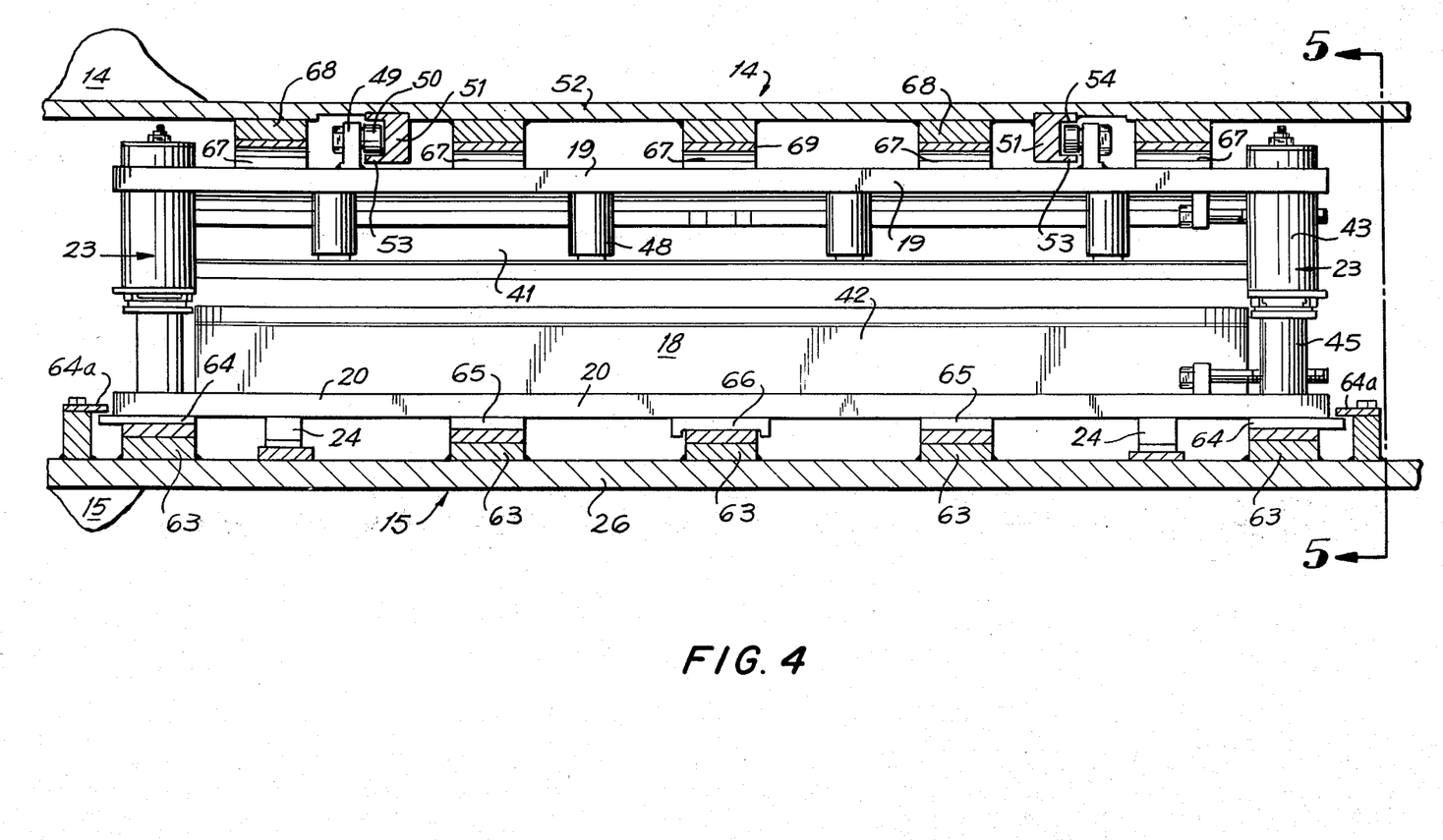
FIG. 4 is a cross sectional view as taken generally along line 4—4 of FIG. 1.

As reflected in FIG. 4, the plate 26 of the lower platen structure 15 mounts a plurality of longitudinally elongated bearing strips 63. These are arranged for cooperation with opposed bearing strips 64–66 carried by the lower carriage plate 20. According to the invention, the several suspension rods 55 are so adjusted in their respective telescoping guide tube assemblies 23 as to normally suspend the upper elements 64–66 of the bearing strip pairs slightly out of contact with the corresponding lower bearing strips 63. In other words, with the entire weight of the shear carriage being supported by the antifriction rollers 50 and guide channels 51, the suspension rods 55 are adjusted to provide a few thousands of an inch of clearance between the opposed pairs of bearing strip elements. Desirably, the least practicable amount of clearance is optimum. Indeed, while it would be less than optimum in some ways, a slight contact of the lower bearing strip pairs would not be wholly inconsistent with the invention. As long as the weight of both the upper and lower sections of the shear carriage is carried primarily by the antifriction rollers 50, a limited amount of friction, imparted by lightly touching bearing strip pairs, might be tolerated. Keeper strips 64a overlie the outer bearing strips 64 to limit lifting of the lower carriage section by the suspension springs.

At the top of the shear carriage, the upper carriage plate 19 mounts a series of bearing strips 67 arranged for cooperation with a like number of bearing strips 68 secured to the plate 52 of the upper platen structure. Pursuant to the invention, the arrangement of the bearing pairs 67, 68, in relation to the antifriction wheels 50, is such that, with the carriage 18 fully supported by the bearing wheels 50, a clearance 69 is provided between all of the upper bearing pairs 67, 68. However, the clearance 69 between the pairs of bearing strips 67, 68 is adequately less than the clearance space 54 above the bearing wheels that the bearing wheels 50 can not contact the upper flanges of the guide channels 51.

Generally, it is desirable to have the pairs of lower bearings strips 63, 64–66 extend the full length of the lower platen assembly 15. Likewise, it may be desirable to have at least the outside sets of bearing strips 67, 68 extend for the full length of the carriage travel. Strictly speaking, however, the pairs of bearing strips are useful primarily in the region of the shearing zone 27.

In the operation of the flying shear apparatus of the invention, when it is desired to sever the continuously moving strip material advancing along the pass line 10, the drive means for the pinion 25 are actuated, so that the racks 24 are driven from left to right in FIG. 1, to accelerate the shear carriage 18. The equipment is designed such that by the time the carriage 18 reaches the primary shearing zone 27, between the tie rod assemblies 16, the carriage is moving synchronously with the strip material. The clutch 39 is then engaged, driving the eccentric shaft 36 through a single revolution. This draws the upper platen assembly 14 downward, compressing the upper and lower components of the shear carriage and causing the strip to be severed by the blades 21, 22.

According to the invention, when the platen structures 14, 15 are in their open position, prior to a shearing operation, the entire weight of the shear carriage 18 is supported solely, or at least primarily by the antifriction rollers 50. Accordingly, when the shearing cycle is commenced, there is a practical minimum of friction to be overcome in accelerating and driving the shear carriage, to bring it into sychronism with the fast moving strip. Thus, there is no contact whatever between the opposed pairs of upper bearing strips and, optimally, there is no contact between the lower bearing strips either.

When the shear carriage is in the shearing zone, and the upper platen 14 begins to descend, it first lowers the carriage into contact with and/or full support by the lower bearing strips. This occurs during the first few thousands of an inch of downward movement of the platen. As this is occurring, the load is being lifted from the antifriction bearing wheels 50, which ultimately lift off the lower channel flange 53 as the entire load is accepted by the lower bearing strips. As the upper platen 14 continues to descend, the upper pairs of bearing strips come into contact. Thereafter, the entire force of the closing action of the platen structure 14, 15 is transmitted into the shear carriage 18 by means of the elongated pairs of bearing strips above and below the carriage. Since the clearance space 69 of the upper bearing strips is less than the upper clearance space 54 above the antifriction wheels, the antifriction wheels are at this stage totally isolated from the force path and maintained free of shock loading.

As will be understood, as soon as the force loading of the closing platens 14, 15 is taken up by the elongated pairs of bearing strips, the shear carriage 18 will be subject to the sliding friction of the bearing strips, which is of course significantly greater in magnitude than the friction of the bearing wheels 50. However, at this stage of the shearing cycle, the increased sliding friction is easily tolerated, because the carriage 18, which has considerable mass, is already traveling at full speed, and the effect of the increased friction is largely absorbed by the moving inertia of the carriage. Likewise, the drive system is at that time free of the acceleration load and thus has adequate spare capacity to take up increased frictional load. An additional significant factor, in this connection, is that the closing and opening cycle of the platen structure 14, to effect the shear, is very brief, so that the sliding friction effects are only momentarily placed on the shear carriage.

Shock loading of the antifriction bearing wheels 50 on the upward or return stroke of the platen 14 is minimized by providing for spring suspension, rather than solid suspension, of the lower carriage plate 20. Thus, when the upper and lower carriage plates 19, 20 separate, with the opening movement of the platens, the lower carriage is not abruptly and rigidly picked up, but is cushioned by the comprising spring.

In carrying out the principles of the invention, optimum simplicity is achieved by suspending the entire carriage from the upper platen, by means of antifriction rollers secured to the upper carriage plate. The various pairs of sliding friction bearing strips are so arranged with respect to the carriage as to be substantially out of contact, until such time as the platens begin to close to effect a shear. Similar advantages might be achieved, although at the expense of a somewhat more complex mechanical arrangement, by resiliently mounting the shear carriage on antifriction bearing wheels engaged with the lower platen structure. Initial clearance between the lower bearing strip pairs, provided by the resilient support of the bearing wheels, would be closed upon the initial compression motions of the platen assembly, and the heavy load of the shearing operation would be absorbed by the bearing strips, rather than the antifriction wheels, in the desired manner.

One of the significant advantages of the invention resides in the fact that the shear carriage may be accelerated substantially more quickly and to greater ultimate speeds with a drive train of given capacity. Substantial savings may be realized in the entire drive train assembly, including clutches, motors, gears and shafts. In addition, by being able to accelerate the shear carriage more quickly, the entire length of the flying shear installation may be reduced.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. In a flying shear of the type including a. a shear carriage comprising a pair of telescopically engaged carriage plates and shear blades carried by said plates for cooperative shearing action upon closing movement of the carriage plates,
b. drive means to drive said shear carriage in the direction of and at the speed of travel of the work to be sheared,
c. upper and lower shear platens positioned in spaced relation respectively above and below the shear carriage and mounted for relative closing movement toward each other for compressing said shear carriage to effect cutting actions of said shear blades, and
d. platen drive means for effecting periodical closing movement of said shear carriage platens, the improvement characterized by
e. antifriction roller means for supporting said shear carriage in operative relation to said shear platens for relatively low friction movement of said carriage along the axes of travel of the work to be sheared,
f. a plurality of cooperating pairs of elongated bearing strips on said carriage plates and shear platens adapted for sliding friction contact,
g. said antifriction roller means being so constructed and arranged as to normally maintain said bearing strips out of substantial sliding friction contact during traversing movements of said shear carriage, and
h. means operative upon closing movement of said shear platens to effectively retract said antifriction roller means, whereby the forces of the shear load are transmitted to said shear carriage primarily by said cooperating pairs of elongated bearing strips.

2. The flying shear of claim 1, further characterized by
a. said antifriction roller means engaging the upper shear platen, whereby substantially the entire weight of the shear carriage is suspended by said rollers from said upper platen,
b. said antifriction roller means being effectively retracted by engagement of certain of said bearing strips with the lower shear platen.

3. The flying shear of claim 2, further characterized by
a. telescoping means connecting the upper and lower carriage plates,
b. said telescoping means including suspension means for suspending the lower carriage plate from the upper carriage plate,
c. said suspension means being arranged to maintain the bearing strips between said lower shear platen and said lower carriage plate substantially free of sliding friction when said shear platens are in the open position.

4. The flying shear of claim 3, further characterized by
a. the bearing strips associated with the upper carriage plate and the upper platen, being so arranged with respect to said antifriction roller means, that said strips are free of contact when said shear platens are in the open position.

5. The flying shear of claim 3, further characterized by
a. said suspension means including suspension rods extending downward from said upper carriage plate toward said lower carriage plate,
b. spring means connected between said suspension means and said lower carriage plate, whereby the lower carriage plate is resiliently supported with respect to the upper carriage plate.

6. A flying shear apparatus comprising
a. upper and lower shear platens,
b. means for moving one of said platens toward the other,
c. a shear carriage positioned between said shear platens and comprising a pair of telescopically engaged carriage plates and shear blades carried by said plates for cooperative shearing action upon closing movement of the carriage plates.
d. cooperating pairs of elongated bearing strips on the respective shear platens and carriage plates for transmitting the closing forces applied to said carriage by closing movement of said platens during a shearing operation,
e. antifriction roller suspension means for said carriage, normally mounting and positioning said carriage with respect to said shear platens in such manner as to minimize or eliminate sliding friction contact between said pairs of bearing strips,
f. said antifriction roller suspension means being so arranged as to prevent the direct application thereto of the full closing force of said shear platens during a shearing operation.

7. A flying shear according to claim 6, further characterized by
a. said antifriction roller suspension means including rollers being carried by and extending above the upper carriage plate,
b. flanged guide members carried by said upper shear platens and engaging and supporting said antifriction rollers,
c. a first clearance space between pairs of upper bearing strips between the upper shear platen and the upper carriage plate, and
d. means for forming a second clearance space above the antifriction rollers, said second clearing space being greater than said first clearance space.

8. The flying shear of claim 6, further characterized by
a. said suspension means including resilient means suspending at least part of said shear carriage, to minimize shock loading on the antifriction rollers during opening movements of said shear platens.

9. The flying shear of claim 8, further characterized by
a. telescoping tubular members interconnecting the upper and lower carriage plates for guided opening and closing movements,
b. yieldable means inside said telescoping members serving resiliently to support the lower carriage plate, and
c. means for adjusting said yieldable means, for regulating the vertical position of said lower carriage plate in the suspended condition.

10. A flying shear apparatus comprising
a. spaced upper and lower shear platens mounted for relative closing movement,
b. a shear carriage positioned for movement in the direction of work travel, between said shear platens,
c. antifriction roller means supporting said carriage from aid upper platen for low friction movement between said platens, d. said carriage being compressible by closing movement of said platens, to effect a shearing operation,
e. cooperating means on said carriage and said platens independent of said antifriction roller means for transmitting to the carriage the forces of closing said platens; and
f. said cooperating means including means for moving said roller means out of contact with said platens.

11. A flying shear of claim 10, further characterized by
a. said means independent of said antifriction roller means comprising elongated pairs of bearing strips adopted for sliding friction contact,
b. means including said antifriction roller means for maintaining said pairs of bearing strips normally substantially free of sliding friction contact, and
c. means operative upon initiation of closing movement of said platens to bring said bearing strips into full sliding friction contact for transmitting the primary force of closing of said platens.

* * * * *